United States Patent [19]
Crowe et al.

[11] Patent Number: 5,731,485
[45] Date of Patent: Mar. 24, 1998

[54] METHOD OF CONTROLLING A HEATER USING HEAT FLUX RATIOS

[75] Inventors: Thomas J. Crowe, Palatine; Dennis M. Clary, Barrington, both of Ill.

[73] Assignee: UOP LLC, Des Plaines, Ill.

[21] Appl. No.: 600,384

[22] Filed: Feb. 12, 1996

[51] Int. Cl.$^6$ .............................. C07C 15/00; C07C 2/00
[52] U.S. Cl. ...................... 585/401; 585/501; 585/263; 208/DIG. 1
[58] Field of Search .................................. 585/401, 501, 585/263; 208/DIG. 1

[56] References Cited

U.S. PATENT DOCUMENTS

| | | | |
|---|---|---|---|
| 3,471,582 | 10/1969 | Lupfer | 585/263 |
| 4,132,529 | 1/1979 | Schwimmer | 585/401 |
| 4,228,509 | 10/1980 | Kennedy | 208/DIG. 1 |
| 4,234,410 | 11/1980 | Kelley | 208/DIG. 1 |
| 4,236,219 | 11/1980 | Killebrew, Jr. et al. | 208/DIG. 1 |
| 4,367,354 | 1/1983 | Dibiano | 585/263 |

OTHER PUBLICATIONS

H. Besl, T. Cusworth, E. A. Livingston Presented at the Platforming Technical Services Symposium, . Chicago, IL, Jul. 27–29, 1993, "Advanced Controls Improve Profitability of UOP CCR Platforming"; also published in *Fuel Reformulation* Nov.–Dec. 1992 with minor changes from symposium.

*Primary Examiner*—Walter D. Griffin
*Attorney, Agent, or Firm*—Thomas K. McBride; Eugene I. Snyder; Maryann Maas

[57] ABSTRACT

An improved method of continuously controlling a multi-zone heater used in a chemical process has been developed. Each zone of the multi-zone heater has an ideal heat flux, FI, and an actual heat flux, FA, and the difference between the heat flux ratios, $\Delta(FA/FI)$, of consecutive zones is to be less than a tolerance, T, where T is in the range of about 0.0 to about 0.1. The control is effected by determining the ideal heat flux, FI, of each zone in the heater and determining the actual heat flux, FA, of each zone in the heater. The difference between the heat flux ratios of FA/FI in consecutive zones is then calculated as $\Delta(FA/FI)$. A manipulated variable of the chemical process is then adjusted according to an algorithm relating the changes in the manipulated variable to changes in the actual heat flux of each zone to afford a new value of the actual heat flux FAN where $|\Delta(FAN/FI)| \leq |\Delta(FA/FI)|$ for consecutive zones. The process is repeated until $|\Delta(FAN/FI)| \leq T$ for all consecutive zones.

4 Claims, No Drawings

1

METHOD OF CONTROLLING A HEATER USING HEAT FLUX RATIOS

BACKGROUND OF THE INVENTION

Industry is continuously investigating ways to improve control methods in order to increase the efficiency of chemical processes. For example, many different control methods have been employed in an aromatic production process in order to provide improved management of the reactor section and tighter product quality. The article entitled "Advanced Controls Improve Profitability of UOP CCR Platforming", by H. Besl, T. Cusworth, and E. A. Livingston and published in *Fuel Reformulation Nov.–Dec. 1992* describes a type of control that has been employed in the Platforming® process. The Platforming process is typically divided into three main sections: the reactor section, the catalyst regeneration section, and the stabilizer section. In the reactor section, there are usually four reactors, each with an associated heater. Since the Platforming reaction is an endothermic reaction, the reaction mixture must be heated before entering the first reactor and in between each of the reactors thereafter. The heaters used may be individual heaters or a single unit heater with a portion of the heater dedicated to each of the reactors. For convenience, these heaters will be termed multi-zone heaters. One goal of the control of these types of heaters has been to prevent the individual zones from being operated beyond their physical limits, thereby causing a failure of one or more zones. The heaters have also been controlled so that the average temperature output of the zones is at some target value. The ultimate goal of this control is to maintain the octane number of the product at some desired value. The octane number of the product has been controlled by adjusting the reactor weight average inlet temperature (WAIT). The control method uses a process model to calculate the required WAIT on the basis of the octane number target value of the product and changes in the process conditions such as feed rate, feed quality, and reactor conditions. The WAIT and the reactor temperature profile, i.e., differences between adjacent reactor inlet temperatures, are controlled to the desired value by manipulating the individual reactor inlet temperatures.

The current invention provides a greater degree of control over multi-zone heaters by incorporating an additional level of control and thereby increasing the efficiency of the heater. According to the invention, the individual zones of the multi-zone heater are controlled using the ideal and actual heat flux values of the zones, as opposed to using the temperature profile. This additional degree of control allows for individual optimization of each zone in the multi-zone heater, which was not available in prior control methods. The invention also allows for balanced equipment usage leading to longer radiant heater coil life and improved radiant efficiency which was not automatically derived from prior control methods.

SUMMARY OF THE INVENTION

The purpose of the invention is to provide an improved method of continuously controlling a multi-zone heater used in a chemical process. Each zone of the multi-zone heater has an ideal heat flux, FI, and an actual heat flux, FA, and the difference between the heat flux ratios, $\Delta(FA/FI)$, of consecutive zones is to be less than 0.1. The control is effected by determining the ideal heat flux, FI, of each zone in the heater and determining the actual heat flux, FA, of each zone in the heater. The difference between the heat flux ratios of FA/FI of consecutive zones is then calculated as $\Delta(FA/FI)$.

A manipulated variable of the chemical process is then adjusted according to an algorithm relating the changes in the manipulated variable to changes in the actual heat flux of each zone to afford a new value of the actual heat flux FAN where $|\Delta(FAN/FI)| \leq |\Delta(FA/FI)|$ for consecutive zones. The process is repeated until $|\Delta(FAN/FI)| \leq T$, where T is arbitrary control tolerance between about 0.0 and about 0.1, for all consecutive zones.

A more specific embodiment of the invention is one where the chemical operation is an aromatic production process or an olefin production process by catalytic dehydrogenation, and the manipulated variable is selected from the group consisting of reactor inlet temperature or heater outlet temperature, recycle gas flow, reactor pressure, feed rate, and heater duty.

DETAILED DESCRIPTION OF THE INVENTION

The present invention provides an improved method of continuously controlling a multi-zone heater by allowing for an increased level of control as compared to historical control methods. This improvement may be applied to the class of heaters requiring multiple reheat zones to support chemical processes containing multiple reactors to perform an endothermic reaction. In these types of heaters, the duties of each of the multiple reheat zones are interrelated and the duty of one zone effects the duties of the other zones. The multiple reheat zones of the heater may be physically located within one unit, or they may be located within independent units. Typically, these heaters are called catalytic reforming reactor section heaters. They are used in various chemical processes, including olefin production processes by catalytic dehydrogenation such as in the Oleflex® process, and in aromatics production processes from naphthenes and paraffins, such as in the Platforming® process. For convenience, this class of heaters will be termed herein as multi-zone heaters.

Historically, most multi-zone heaters have been controlled individually by zone without interrelating the various zones. Recently, some multi-zone heaters have been controlled using multivariable control methods. Multivariable control methods coordinate the manipulation of reactor outlet temperatures, feed flow, pressure, heater duty, and recycle gas flow in order to control WAIT and in order to avoid equipment constraints including heater limits. However, in the absence of over-riding constraints, existing multivariable control applications only coordinate reactor inlet temperatures in order to control temperature profile.

Such multivariable control methods are usually a part of a control cascade scheme with the multivariable control of the heaters being only one level within the cascade. A typical control cascade used to effect heater control in these processes manipulate fuel delivery to the fired heater at the lowest level. Fuel delivery can be manifested in fuel gas burner manifold pressure control, or fuel gas flow control, wherein a fuel control valve is adjusted to maintain the pressure or flow of fuel at the burner. The fuel can be either gas or oil, with gas being more typical, and oil controls being somewhat more complicated but also contained at this level of the cascade. The next level of cascade is a temperature control loop which manipulates fuel gas pressure or flow setpoint in order to control reactor inlet temperature or heater outlet temperature. The multivariable control level of the cascade manipulates the heater outlet temperature setpoint in order to fulfill its control objectives of maintaining target WAIT, feed flow, pressure, and recycle gas hydrogen to feed molar flow ratio variables and maintaining operation of the process within heater tubewall temperature, heater allowable duties or fluxes, recycle gas compressor, net gas compressor and other limits. Additional levels of the control cascade include inferential model based controllers which control octane through manipulation of WAIT target to the multivariable control.

Multivariable control methods, which may be part of a control cascade, have been used in industry and involve controlled variables, constraints, and manipulated variables. Controlled variables are those parameters whose values are sought to be controlled to a target, or set point, value. Each controlled variable has an associated upper and lower limit which defines the acceptable zone of control, and the control method attempts to maintain the controlled variable within these limits. In an aromatics producing process the controlled variables typically include the weight average inlet temperature (WAIT), hydrogen to hydrocarbon ratio, pressure, feed rate, and temperature profile. A process operating at the target value for each controlled variable should provide a product meeting a specific criteria. For example, in an aromatics producing process if all the controlled variables listed above are operating at the target values, the process product should have a desired octane number.

Manipulated variables are those operating parameters that may be changed in order to induce a change in a controlled variable. In an aromatics producing process typical manipulated variables include individual reactor inlet temperatures, recycle gas flow, pressure, and feed rate. Constraints are the physical limitations of the heater zones such as the maximum tube wall temperature, the maximum duty, and the compressor limits. The constraints operate additional controlled variables which only impact the outputs to the manipulated variables when constraint limits are approached. When a constraint variable limit is approached, the multivariable controller sacrifices control of one of the other target variables in order to satisfy the constraint. Different processes may involve different controlled variables, manipulated variables and constraints.

For purposes of describing the present invention, the historically used controlled variables of temperature profile and WAIT are the most pertinent. Other typically used controlled variables may be involved in the control process incorporating the invention in the same manner as they have been used previously, therefore, the focus here will be on the temperature profile and WAIT since the invention improves the control of these variables. The temperature profile is the temperature of the streams leaving individual zones of the heater plotted against the numerical designation of the zones, i.e., zone 1, zone 2, zone 3, and so on. Typically, the target of the temperature profile would be a flat profile located at a target temperature, meaning that each zone of the heater is to provide the same outlet temperature. If experience with a particular system indicated that an individual zone should provide a higher or lower temperature, the profile will indicate the variation, however, flat target profiles are the most commonly encountered target profiles. Using a flat target temperature profile fails to account for the varying heat of reaction across different catalyst beds requiring a variation of the duty called for on each heater zone. Chemical processes, and catalytic reforming in particular, are subjected to disturbances which cause variations in the required heater duties. The heater duties are needed to replenish the heat of reaction consumed in endothermic reactions. The heat of reaction varies with feed composition. Total heater duty varies with feed flow, recycle gas flow, and heat of reaction. The distribution of heater duty varies with all of the above. A flat temperature profile target does not account for the variation in heater duty distribution that can arise from these disturbances.

WAIT is the weight average inlet temperature or the average of the temperatures of the streams leaving the individual zones of the heater weighted by the quantity of catalyst in the corresponding reactor. When the target temperature profile is flat and WAIT is to be controlled to a target value of X, then any combination of individual temperatures that average to X will satisfy the control of the WAIT. If one individual zone was limited by a constraint, the other zones would be further manipulated in order to reach a WAIT of X. This manipulation is performed without consideration as to which zone should be varied by what amount in order to make the overall process more efficient.

The present invention provides more efficient control of the heater by involving heat flux as a controlled variable in place of temperature profile. Heat flux is defined as the heat absorbed divided by the heat transfer area. The heat transfer area is a physical aspect of the zone and is therefore a constant. Heat absorbed refers to how much heat is transferred to the process stream in the zone. Heat absorbed may be calculated according to the equation:

$$Q=(M)(Cp)(\Delta T)$$

where:

Q=heat absorbed (kcal/hr)

M=mass flow, feed plus recycle gas (kg/hr)

Cp=heat capacity (kcal/kg-°C.)

$\Delta T$=difference in temperature of process stream at inlet and outlet of zone, °C.

Each cell is designed for a certain heat absorption into the process stream. Design considerations include geometry of the radiant section of the heater in order to effect efficient heat absorption. As heat absorption is decreased from the design value, efficiency decreases. Each zone has a physical limitation as to how much heat can be transferred to the process stream. After a maximum is reached, additional fuel put into the heater has diminishing effect. Therefore, each zone has a region of heat adsorption that is most efficient. By operating each zone in its most efficient region, the overall efficiency of the heater is improved. Balancing heater fluxes between cells tends to balance the deterioration of the cells attributable to normal wear and tear. Consequently, the need for premature maintenance of individual heater cells will be decreased.

The present invention takes advantage of the differences in the zones of the heater and balances the heat fluxes across the heater to improve efficiency as follows. Each zone in a multi-zone heater has an ideal heat flux which can be calculated from the design specifications of the heater. The actual heat flux during operation can be determined according to the equation discussed above. The heat flux ratio is defined as the actual heat flux divided by the ideal heat flux. The heater is controlled so that the difference in the heat flux ratios of consecutive zones is less than or equal to a tolerance, which is in the range of 0 to about 0.1.

The steps in controlling the heater using heat flux include first determining the ideal heat flux, FI, of each zone in the heater. Then the actual heat flux, FA, of each zone in the heater is determined at some staking set point of the manipulated variables. The heat flux ratio of each zone is then calculated as FA/FI, and the difference in heat flux ratios, $\Delta$(FA/FI), for consecutive zones is then calculated. The manipulated variable is then adjusted according to a predetermined algorithm relating the changes in the manipulated variable to changes in the actual heat flux of each zone to afford a new value of the actual heat flux, FAN, where $|\Delta(FAN/FI)| \leq |\Delta(FA/FI)|$ for consecutive zones. The adjustments of the manipulated variable is repeated until $|\Delta(FAN/FI)| \leq T$, where T is in the range of about 0.0 to about 0.1, for all consecutive zones. The algorithm may be any suitable algorithm known in the art such as multivariate regression.

Controlling for heat flux ratio provides an additional level of control over previous control methods in that each individual zone may be controlled to its maximum efficiency. If the heat input contribution of an individual zone is low, the heat input contribution of the zone may be increased through increasing the outlet temperature or other manipulated variable to effect increased heat input. On the other hand, if the heat input contribution of the individual zone is high, the zone may be decreased through decreasing the outlet temperature or changing another manipulated variable to effect decreased heat input. The control method may effect a staggered temperature profile that varies with process disturbances to the unit as compared to the historical practice of controlling all the zones to a flat temperature profile.

The improvement afforded by this invention may be illustrated by considering a simplified theoretical example. In a multi-zone heater having zones Z1–Z4, the ideal heat flux, FI, is determined from the design specifications to be 20,000 Bth/hr/ft$^2$ for Z1, 15,000 Bth/hr/ft$^2$ for Z2, 15,000 Bth/hr/ft$^2$ for Z3, and 15,000 Bth/hr/ft$^2$ for Z4. The actual heat flux for each zone is then determined through measuring the mass flow through the zone, calculating the heat capacity of the process stream, and measuring the difference in the temperature of the process stream entering and exiting the zone. For this example, the actual heat flux of each zone is determined to be 20,000 Bth/hr/ft$^2$ for Z1, 20,000 Bth/hr/ft$^2$ for Z2, 10,000 Bth/hr/ft$^2$ for Z3, and 13,000 Bth/hr/ft$^2$ for Z4. At these operating conditions, the heat flux ratio of each zone is:

| Z1 | Z2 | Z3 | Z4 |
|---|---|---|---|
| $\frac{20,000}{20,000}$ | $\frac{20,000}{15,000}$ | $\frac{10,000}{15,000}$ | $\frac{13,000}{15,000}$ |

Only Z1 is operating at maximum efficiency, having a heat flux ratio of about 1.0. Z2 is operating at a heat flux ratio of 1.3 and is therefore "working harder" than is necessary and decreasing efficiency. On the other hand, Z3 is operating a heat flux ratio of about 0.7 and Z4 is operating at a heat flux ratio of about 0.9 and both are therefore "not working hard enough" and further decreasing efficiency. The difference in heat flux ratios between consecutive zones is 0.3 between Z1 and Z2, 0.6 between Z2 and Z3, 0.2 between Z3 and Z4, and 0.1 between Z4 and Z1. The control method of the invention would then call for the adjustment of a manipulated variable such as the inlet temperature for each reactor. The degree of adjustment is according to an algorithm such as multivariate regression which relates the changes in the manipulated variable to changes in the actual heat flux of each zone. After adjustment, the actual heat flux for each zone is again determined, the heat flux ratio is calculated for each zone, and the difference in heat flux ratios between consecutive zones determined. The control method continues in this manner until the difference in the heat flux ratios between each consecutive zone is less than a tolerance where the tolerance is in the range of 0.0 to about 0.1. The control method may be multivariable control as discussed previously, any other suitable commonly known control method such as proportional integral derivative control.

What is claimed is:

1. A method for continuously controlling a multi-zone heater used in a chemical process having a manipulated variable, where each zone of the multi-zone heater has an ideal heat flux, FI, and an actual heat flux, FA, and where the difference between the heat flux ratios, $\Delta(FA/FI)$, of consecutive zones is to be less than T where T is in the range of about 0.0 to about 0.1, said process comprising:

a) determining the ideal heat flux, FI, of each zone in said heater;

b) determining the actual heat flux, FA, of each zone in said heater;

c) calculating the heat flux ratio FA/FI for each zone in said heater and calculating the difference in heat flux ratios, $\Delta(FA/FI)$, for consecutive zones;

d) adjusting a manipulated variable according to an algorithm relating the changes in the manipulated variable to changes in the actual heat flux of each zone to afford a new value of the actual heat flux, FAN, for each zone where $|\Delta(FAN/FI)| \leq |\Delta(FA/FI)|$ for consecutive zones;

e) repeating until $|\Delta(FAN/FI)| \leq T$ for all consecutive zones.

2. The method of claim 1 where the chemical process is selected from the group consisting of an aromatic production process and an olefin production process by catalytic dehydrogenation.

3. The method of claim 1 where the manipulated variable is selected from the group consisting of reactor inlet temperature, recycle gas flow, reactor pressure, feed rate, and heater duty.

4. The method of claim 1 where said algorithm is selected from the group consisting of multivariable control and proportional integral derivative control.

* * * * *